UNITED STATES PATENT OFFICE.

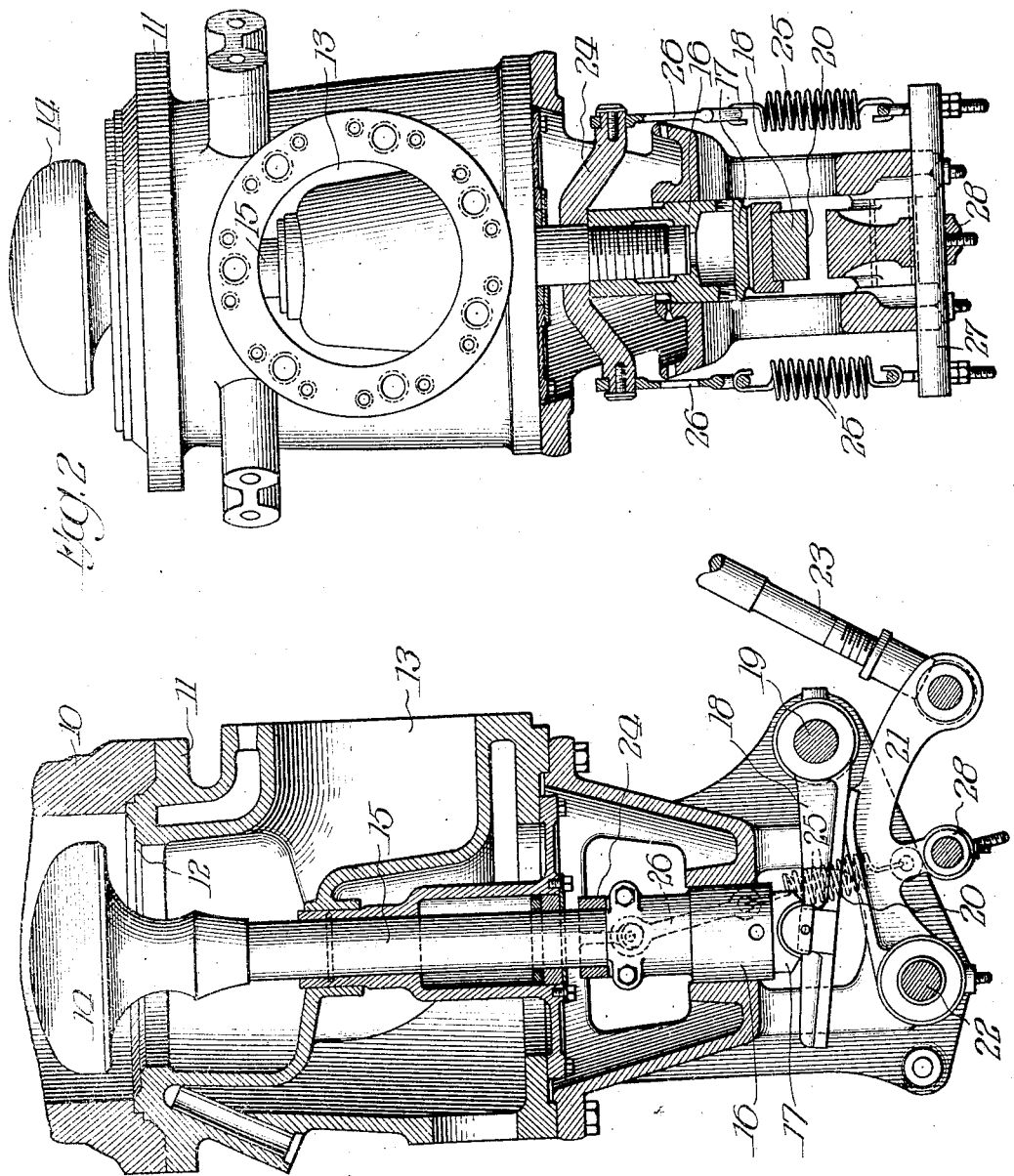

HENRY G. O'REILLY, OF JOLIET, ILLINOIS, AND CHARLES C. SAMPSON, OF DULUTH, MINNESOTA.

VALVE MECHANISM.

1,126,843. Specification of Letters Patent. Patented Feb. 2, 1915.

Application filed October 6, 1913. Serial No. 793,603.

*To all whom it may concern:*

Be it known that we, HENRY G. O'REILLY and CHARLES C. SAMPSON, citizens of the United States, residing at Joliet, in the county of Will, State of Illinois, and Duluth, county of St. Louis, State of Minnesota, respectively, have invented certain new and useful Improvements in Valve Mechanism, of which the following is a specification.

Our invention relates to internal combustion engines and has particular reference to a novel valve control for such engines.

In the operation of internal combustion engines, particularly of the type employing gas as a fuel, which engines are usually of very large size, the problem of maintaining the spring control for the puppet valves is a considerable one. It will be understood that an efficient valve must be seated tightly, particularly on the suction stroke, to prevent leakage and that the spring pressure must be sufficient to accomplish this; however, in the usual method of application, the spring must be additionally compressed when the valve is lifted, the greatest force of the spring being exerted thereon while the valve is unseated and no spring pressure is needed; or in other words, the spring is under the least tension or compression, or exerts its smallest force, when the valve is closed. A further objection to the springs commonly employed is in that on account of the restricted space available springs are designed too near the safe elastic limit and are, therefore, subject to excessive breakage; on account of such breakage it is necessary to replace the springs which requires the stoppage of the engine and adds materially to the labor charge against the engine, in addition to requiring the stoppage of the machines operated thereby. A third objection to the ordinary form of valve engines is in that they are usually located centrally with relation to the valve stem and in an inclosed space adjacent to the port. On the exhaust side this spring is necessarily exposed to considerable heat which soon affects the temper of the spring and adds to the breakage.

We have conceived the idea of locating the valve springs outside of the casing, providing two of such springs and locating the support for the springs on the eccentric bar, whereby the springs move bodily with the valve stem. By this means the springs are under practically the same tension whether the valve is raised or seated. This provides for the maximum efficiency of the spring while the valve is seated without necessitating extreme compression or tension in the raised position of the valve. Furthermore, by providing two springs and locating them outside of the casing, if one of such springs should become broken, it may easily and quickly be replaced without stopping the engine or materially decreasing its efficiency.

Our invention will be more readily understood by reference to the accompanying drawings wherein—

Figure 1 is a vertical section through a valve and control therefor, constructed in accordance with our invention, and Fig. 2 is a side elevation, partly in sections, the view being taken at right angles to that of Fig. 1.

Referring more particularly to the drawings, it will be seen that we provide an engine 10, to which is secured a valve casing 11 having a valve seat 12. A conduit 13 provides communication between the engine cylinder and an outlet or exhaust manifold.

The valve 14 is provided with the usual stem 15 which extends downward and is threaded into an extension 16, this extension having a bearing 17 on its lower end. Coöperating with the bearing 17 is a lever 18, pivoted at 19, and having a flat bearing surface 20, with which a cam lever 21 coöperates; the lever 21 is pivoted at 22 and is actuated by a rod 23 controlled by the eccentric of the engine, not shown.

The spring control for the valve comprises a yoke 24 having a bearing on a shoulder formed by the upper end of the extension 16. The springs 25, of which we preferably provide two, are secured to the free ends of the yoke 24 by means of links 26, the lower ends of the springs having a hooked connection to a short rod or shaft 27, mounted at 28 in the cam lever 21. It will be seen that as the cam lever 21 is rocked by the eccentric rod the springs move up and down in unison therewith and in unison with the valve, and that the spring tension may be the same when the valve is seated as when it is in the raised position; thus the load is divided between two springs, the springs are not extended beyond their safe, elastic limit, they are removed from intense heat and either thereof may be replaced without interruptions to the operation of the engine.

The rocker arm 21 has the functions of a cam and its equivalents will readily suggest themselves to others. In the claims we have referred to this element as a cam with the understanding that all reasonable equivalents are encompassed in the term.

It is obvious that certain modifications may be made in the construction shown, and such modifications as are within the scope of our claims we consider within the spirit of our invention.

We claim:

1. In a valve mechanism, the combination of a valve, a cam element for actuating said valve, and a spring connecting said valve and said cam element, said spring being mounted for bodily movement with said cam element and said valve, substantially as described.

2. In a valve mechanism, the combination of a valve having a stem, a rocker arm acting as a cam, said arm being pivoted near the end of said stem, and a spring directly connecting said valve and said rocker arm, whereby said spring is lifted bodily with said valve, substantially as described.

3. In a valve mechanism, the combination of a valve having a stem, a rocker arm serving as a cam, said arm being pivoted near the end of said stem, and a pair of springs located on opposite sides of said stem and arm and adapted for bodily movement with said valve, substantially as described.

4. In a valve mechanism, the combination of a valve having a stem, an idler rocker arm, a second rocker arm acting as a cam and acting on said idler to lift said valve, projections on the sides of said valve stem and said second rocker arm, and springs on said projections connecting the respective parts and adapted for bodily movement with the valve, substantially as described.

HENRY G. O'REILLY.
CHARLES C. SAMPSON.

Witnesses for Henry G. O'Reilly's signature:
CHAS. T. MASON,
H. R. KUEHN.

Witnesses for Chas. C. Sampson's signature:
J. H. SMITH,
L. C. REIS.